US008665883B2

(12) United States Patent
Balus et al.

(10) Patent No.: US 8,665,883 B2
(45) Date of Patent: Mar. 4, 2014

(54) GENERALIZED MULTI-HOMING FOR VIRTUAL PRIVATE LAN SERVICES

(75) Inventors: Florin Balus, Cupertino, CA (US); Wim Henderickx, Westerlo (BE); Nehal Bhau, San Jose, CA (US); John Lynn, Belmont, CA (US)

(73) Assignee: Alcatel Lucent, Paris (FR)

( * ) Notice: Subject to any disclaimer, the term of this patent is extended or adjusted under 35 U.S.C. 154(b) by 154 days.

(21) Appl. No.: 13/036,125

(22) Filed: Feb. 28, 2011

(65) Prior Publication Data

US 2012/0219004 A1   Aug. 30, 2012

(51) Int. Cl.
*H04L 12/28* (2006.01)

(52) U.S. Cl.
USPC ................ 370/395.53; 370/400; 370/401

(58) Field of Classification Search
USPC .................................................. 370/395.53
See application file for complete search history.

(56) References Cited

U.S. PATENT DOCUMENTS

| | | | | |
|---|---|---|---|---|
| 7,284,068 | B1 * | 10/2007 | Ramalho | 709/245 |
| 2005/0132088 | A1 * | 6/2005 | Sridhar et al. | 709/249 |
| 2006/0092940 | A1 * | 5/2006 | Ansari et al. | 370/392 |
| 2006/0268681 | A1 * | 11/2006 | Raza | 370/216 |
| 2008/0112323 | A1 * | 5/2008 | Agmon et al. | 370/235 |
| 2010/0232785 | A1 * | 9/2010 | Gazier et al. | 398/8 |
| 2010/0329109 | A1 * | 12/2010 | Kothari et al. | 370/216 |
| 2011/0286462 | A1 * | 11/2011 | Kompella | 370/395.53 |
| 2012/0177054 | A1 * | 7/2012 | Pati et al. | 370/395.53 |

OTHER PUBLICATIONS

M. Lasserre, V. Kompella, "Virtual Private LAN Service (VPLS) Using Label Distribution Protocol (LDP) Signaling," Network Working Group, RFC 4762, Standards Track, Jan. 2007. http://tools.ietf.org/html/rfc4762.
K. Kompella, Y. Rekhter, "Virtual Private LAN Service (VPLS) Using BGP for Auto-Discovery and Signaling," Network Working Group, RFC 4761, Standards Track, Jan. 2007. http://tools.ietf.org/html/rfc4761.
B. Kothari et al., "BGP based Multi-homing in Virtual Private LAN Service draft-ietf-12vpn-vpls-multihoming-02.txt," Network Working Group Internet Draft, Standards Track, Oct. 25, 2010. http://tools.ietf.org/html/draft-ietf-12vpn-vpls-multihoming-02.

* cited by examiner

*Primary Examiner* — Hassan Phillips
*Assistant Examiner* — Siren Wei
(74) *Attorney, Agent, or Firm* — Wall & Tong, LLP

(57) ABSTRACT

A generalized multi-homing capability is depicted and described herein. The generalized multi-homing capability supports use of a generalized multi-homed site object and associated generalized multi-homed site identifier for Virtual Private LAN Services (VPLS). For example, a generalized multi-homed site object may be generated using a multi-homed site object by associating an Ethernet endpoint object and a pseudowire endpoint object with the multi-homed site object. For example, a generalized multi-homed site object may be generated using a multi-homed site object by associating an Ethernet endpoint object with the multi-homed site object and associating one or more Ethernet-related objects with the Ethernet endpoint object. The generalized multi-homed site object is configured to support multiple types of endpoints, thereby enabling multi-homing to be supported for various types of devices in various types of networks (e.g., between devices of customer and service provider networks, between devices within a service provider network, between devices of different service provider networks, and the like) and for various types of services.

20 Claims, 8 Drawing Sheets

GENERALIZED MULTI-HOMING FOR VIRTUAL PRIVATE LAN SERVICES

FIELD OF THE INVENTION

The invention relates generally to communication networks and, more specifically but not exclusively, to providing multi-homing in communication networks.

BACKGROUND

Virtual Private Local Area Network (LAN) Service (VPLS) is a class of Virtual Private Network (VPNs) supporting the connection of different sites in a single bridged domain via Internet Protocol (IP)/Multiprotocol Label Switching (MPLS) networks, thereby allowing different sites to communicate as if connected to a common LAN. In VPLS, the LAN at each of the different sites is extended to the edge of the provider network, and the service provider emulates a bridge or switch to connect the different LANs of the different sites in order to create a single bridged LAN. In VPLS, any-to-any connectivity and communications between different sites may be supported. There are two VPLS implementations that are supported by the Internet Engineering Task Force (IETF) as follows: RFC 4761 which uses Border Gateway Protocol (BGP) signaling and RFC 4762 which uses Label Distribution Protocol (LDP) signaling.

Hierarchical VPLS (H-VPLS) has been introduced to provide several scaling and operational advantages over traditional VPLS. The scaling advantages of H-VPLS are obtained by introducing hierarchy to VPLS, thereby eliminating the need for a full mesh of pseudowires (PWs) and Label Switched Paths (LSPs) between all participating devices. For example, the hierarchy may be provided by augmenting a base VPLS core mesh of PE-to-PE PWs (referred to as hub PWs) with access PWs (referred to as spoke PWs) to form a two-tier hierarchical VPLS model. The operational advantages of H-VPLS may include centralization of major functions in PE routers (e.g., VPLS endpoint auto-discovery, participation in a routed backbone, and the like), centralization of provisioning, and the like.

Given the increasing use of H-VPLS to provide VPLS services within service provider networks, a complete VPLS solution must provide support for both access resiliency and H-VPLS resiliency. Disadvantageously, however, while solutions for providing these types of resiliency exist today, such solutions are fragmented and unrelated to each other and, thus, must be configured and managed independently. For example, existing solutions for providing access resiliency may include using a multi-chassis (MC) link aggregation group (LAG) solution (MC-LAG) or using a Management VPLS using a Spanning Tree Protocol (STP). For example, existing solutions for providing H-VPLS resiliency may include various LDP-based solutions, such as using active/standby PWs, a multi-chassis endpoint (MC-EP) solution, or using a Management VPLS using an STP.

SUMMARY

Various deficiencies in the prior art are addressed by embodiments related to a multi-homed site object configured for use in supporting multi-homing for Virtual Private LAN Service (VPLS).

In one embodiment, an apparatus includes a processor configured to identify a multi-homed site object for a VPLS, associate an Ethernet endpoint object with the multi-homed site object for the VPLS, and associate a pseudowire endpoint object with the multi-homed site object for the VPLS.

In one embodiment, a method includes using a processor for identifying a multi-homed site object for a VPLS, associating an Ethernet endpoint object with the multi-homed site object for the VPLS, and associating a pseudowire endpoint object with the multi-homed site object for the VPLS.

In one embodiment, an apparatus includes a processor configured to identify a multi-homed site object for a VPLS, associate an Ethernet endpoint object with the multi-homed site object for the VPLS, and perform at least one of: associate a Virtual LAN (VLAN) Identifier object with the Ethernet endpoint object, associate a G.8031 tunnel object with the Ethernet endpoint object, and associate a G.8032 ring object with the Ethernet endpoint object.

In one embodiment, a method includes using a processor for identifying a multi-homed site object for a VPLS, associating an Ethernet endpoint object with the multi-homed site object for the VPLS, and performing at least one of: associating a Virtual LAN (VLAN) Identifier object with the Ethernet endpoint object, associating a G.8031 tunnel object with the Ethernet endpoint object, and associating a G.8032 ring object with the Ethernet endpoint object.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Figure 1:
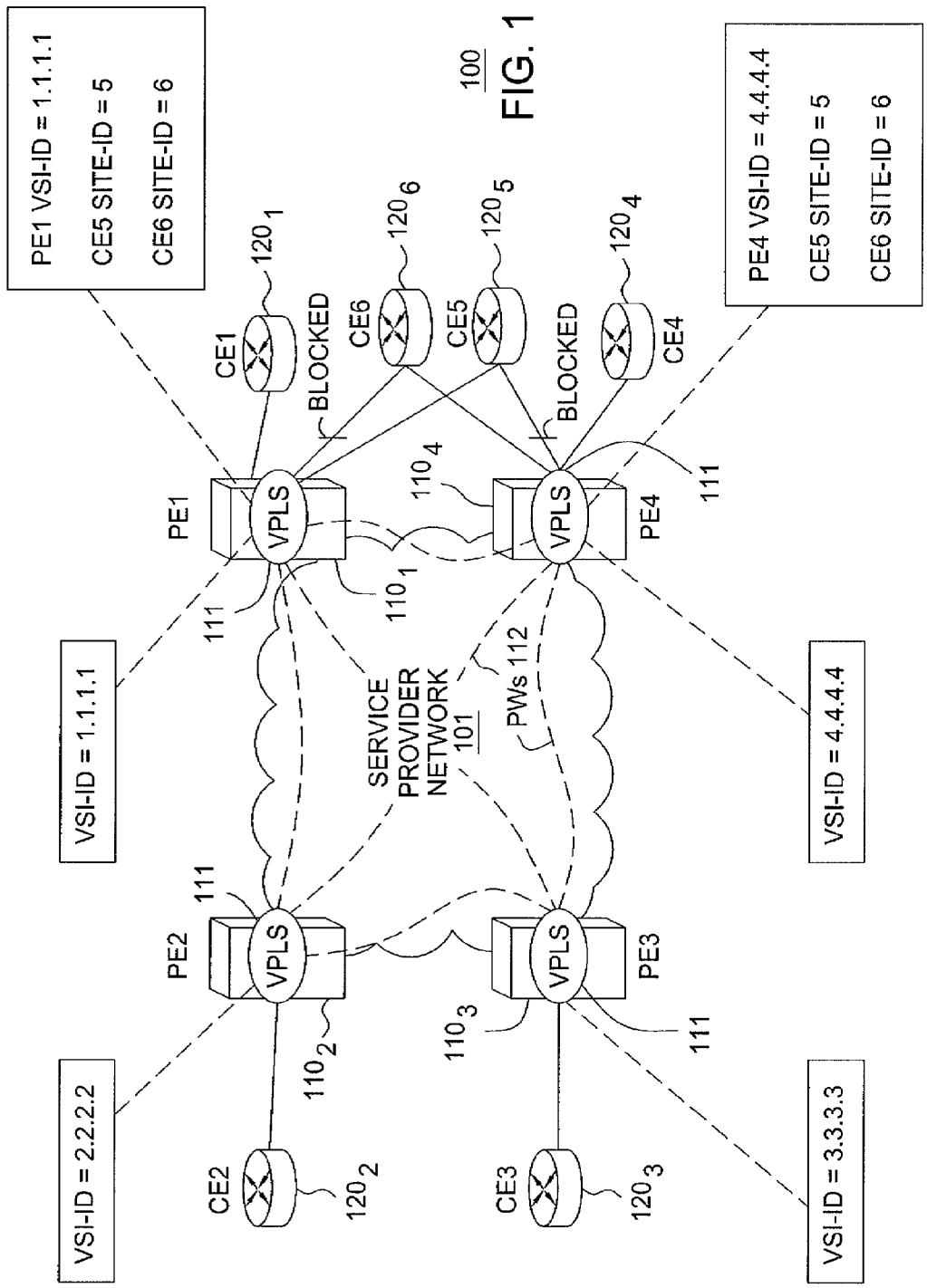
FIG. 1 depicts an exemplary communication system illustrating VPLS using BGP-based multi-homing for multi-homed customer devices.

A generalized multi-homing capability is depicted and described herein, although it is noted that various other related and/or unrelated capabilities also may be disclosed.

In at least some embodiments, a generalized multi-homing capability supports use of a generalized multi-homed site object and associated generalized multi-homed site identifier. In at least some embodiments, a generalized multi-homed site object is configured to support multiple types of endpoints, thereby enabling multi-homing to be supported for various types of devices in various types of networks (e.g., between devices of customer and service provider networks, between devices within a service provider network, between devices of different service provider networks, and the like) and for various types of services (e.g., for Label Distribution Protocol (LDP) VPLS, for Border Gateway Protocol (BGP) VPLS, for Provider Backbone Bridging (PBB) BVPLS on Backbone Core Bridges (BCBs), and the like, as well as various combinations thereof).

In at least some embodiments, a generalized multi-homing capability is provided using BGP, such that the generalized multi-homing capability easily lends itself to widespread applicability to service providers (e.g., since many service providers use BGP for route advertisements and auto-discovery functions for VPLS services and, further, since BGP is the most widely used mechanism for inter-AS and inter-provider services).

In at least some embodiments, a generalized multi-homing capability provides a single solution that fits many service provider environments while addressing, with a common mechanism, various resiliency scenarios. For example, the generalized multi-homing capability advantageously provides a single solution for access and Hierarchical VPLS (HVPLS) resiliency, whereas existing approaches require two separate solutions.

In at least some embodiments, the generalized multi-homing capability provides a simpler solution, including improvements in ease of implementation, efficiency, and the like.

Various embodiments of the generalized multi-homing capability may include one or more of the following features: (1) use of a generalized and hierarchical multi-homed site object which may have various different types of objects mapped thereto (e.g., Ethernet endpoint objects, pseudowire (PW) endpoint objects, and the like, as well as various combinations thereof), (2) decoupling of the multi-homed site identifier (SITE-ID) from the type of objects that it controls, where the existence of the multi-homed SITE-ID means that the same generic procedure could apply to one or more different objects (e.g., Ethernet endpoint objects associated with Ethernet tunnels and/or Ethernet rings, PW endpoint objects, and the like, as well as various combinations thereof), (3) a designated forwarder election algorithm, and (4) a blackhole avoidance scheme supporting blackhole avoidance for Ethernet solutions and PW-based solutions (e.g., using MAC flush indications toward the core PEs and providing indications of DF election results toward the CE and PE devices using Ethernet OAM for Ethernet solutions and LDP signaling for PW-based solutions).

Figure 2:
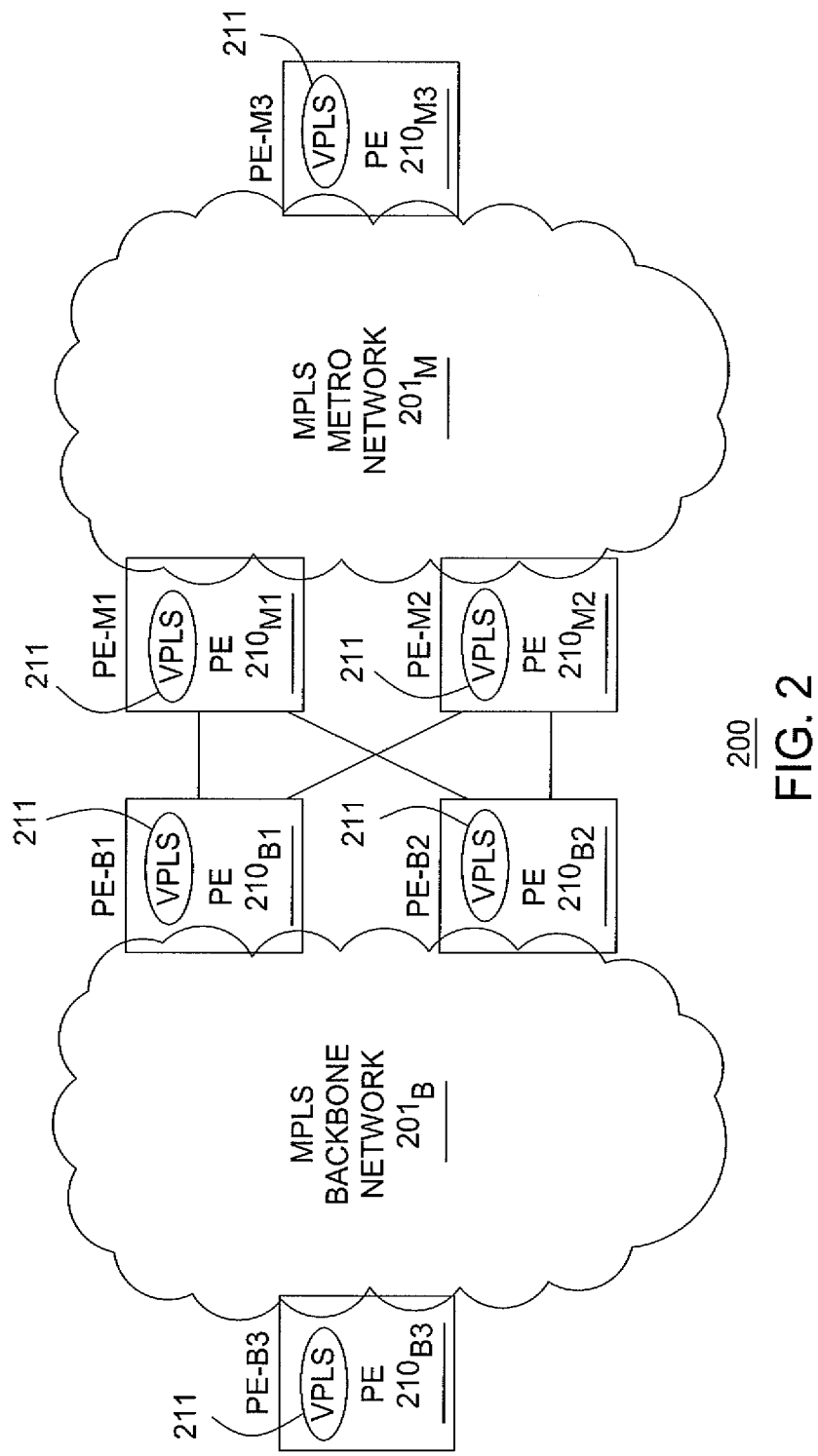
FIG. 2 depicts an exemplary communication system illustrating VPLS using BGP-based multi-homing for multi-homed provider edge devices.

The various configurations and applications of the generalized multi-homed site object and associated generalized multi-homed site identifier may be better understood by considering different types of communications systems in which such generalized multi-homed site objects and associated generalized multi-homed site identifiers may be used, two of which are depicted and described with respect to FIGS. 1 and 2.

FIG. 1 depicts an exemplary communication system illustrating VPLS using BGP-based multi-homing for multi-homed customer devices.

As depicted in FIG. 1, exemplary communication system 100 includes a service provider network 101 including four provider edge (PE) devices $110_1$-$110_4$ (collectively, PEs 110, and also denoted herein as PE1, PE2, PE3, and PE4, respectively) which provide access to service provider network 101 for six customer edge (CE) devices $120_1$-$120_6$ (collectively, CEs 120, and also denoted herein as CE1, CE2, CE3, CE4, CE5, and CE6, respectively).

The PEs 110 have a VPLS service 111 provisioned thereon. The VPLS service 111 includes a plurality of virtual switching instances (VSIs) which are associated with the PEs $110_1$-$110_4$, respectively, such that the PEs $110_1$-$110_4$ each have a VSI-Identifier (VSI-ID) associated therewith for the VPLS 111 (illustratively, PE1 has a VSI-ID of 1.1.1.1, PE2 has a VSI-ID of 2.2.2.2, PE3 has a VSI-ID of 3.3.3.3, and PE4 has a VSI-ID of 4.4.4.4), respectively. The PEs 110 also or alternatively may have respective VPLS Edge Device Identifiers (VE-IDs) associated therewith for VPLS service 111.

The PEs 110 are interconnected in a mesh topology using pseudowires (PWs) 112, forming thereby a PW infrastructure between the VSIs of VPLS 111. In one embodiment, this PW infrastructure between VSIs may be built using procedures from RFC 4761 (BGP VPLS), procedures from RFC 4762 (LDP VPLS), a mix of PW signaling procedures, and the like. In general, the PW infrastructure of the service provider network 101 may be signaled in any suitable manner (e.g., although service provider network 101 is primarily depicted and described with respect to an embodiment in which a PW infrastructure is signaled with LDP for an LDP VPLS using BGP-AD for discovery, it will be appreciated that the various embodiments depicted and described with respect to exemplary communication system 100 may be utilized with a PW infrastructure signaled with BGP or with a PW infrastructure signaled using a mix of LDP-signaled and BGP-signaled PWs).

The CEs 120 access service provider network 101 via the PEs 110. The CEs $120_1$-$120_4$ are connected to PEs $110_1$-$110_4$, respectively, each of the CEs $120_1$-$120_4$ being single-homed CEs (which also may be referred to herein as single-homed CEs). The CEs $120_5$ and $120_6$ are both multi-homed CEs (which also may be referred to herein as multi-homed sites), with each of CEs $120_5$ and $120_6$ being connected to both PE $110_1$ and PE $110_4$.

In one embodiment, while VPLS multi-homing using BGP-MP expands on the BGP AD and BGP VPLS provisioning model, the addressing for the base VSI (VSI-ID or VE-ID) is independent from the addressing for the multi-homed sites.

In one embodiment, each multi-horned CE (illustratively, CEs $120_5$ and $120_6$) is represented in the VPLS context via a multi-homed object having a multi-homed identifier (denoted as multi-homed SITE-ID) associated therewith. In one embodiment, the multi-homed SITE-ID is unique within the scope of the VPLS 111, and serves to differentiate between multi-homed CEs 120 connected to the same VPLS instance (i.e., to the same VSI on the same PE 110). For example, in FIG. 1, CE $120_5$, which is multi-homed to both PE $110_1$ and PE $110_4$, will be assigned the same multi-homed SITE-ID on both PE $110_1$ and PE $110_4$ (denoted as CE5 SITE-ID=5). Similarly, for example, CE $120_6$, which is multi-homed to both PE $110_1$ and PE $110_4$, will be assigned the same multi-homed SITE-ID on both PE $110_1$ and PE $110_4$ (denoted as CE6 SITE-ID=6). However, for the same VPLS instance, different SITE-IDs are assigned for multi-homed CEs $110_5$ and $110_6$ (for example, as illustrated in FIG. 1, SITE-ID=5 is assigned for CE $110_5$ and SITE-ID=5 is assigned for CE $110_5$). The single-homed CEs $110_1$-$110_4$ do not require allocation of a multi-homed SITE-ID; rather, single-homed CEs $110_1$-$110_4$ are associated with the addressing for the base VSI (e.g., either the VSI-ID or the VE-ID).

As will be appreciated, for each multi-homed CE 120, a designated forwarder (DF) election algorithm is executed for electing one of the PEs 110 to which the CE 120 is multi-homed to be the designated forwarder for the CE 120. In one embodiment, the DF election algorithm is implemented using the DF election procedure described in IETF Working Group Document, entitled "BGP based Multi-homing in Virtual Private LAN Service" and indicated by "draft-ietf-l2vpn-vpls-multihoming," which is hereby incorporated by reference herein in its entirety. In one embodiment, only the local PEs 110 actively participate in the DF election algorithm (i.e., any PEs 110 remote from the multi-homed CE 120 are not required to participate in the DF election process). In one embodiment, the DF election algorithm is executed upon activation of a multi-homed site. As a result of the execution of the DF election algorithm, all of the PEs 110 associated with a multi-homed CE 120 in the VPLS will be placed in a standby state except for the PE 110 that is selected as the DF for the CE 120.

As depicted in FIG. 1, PE1, rather than PE4, has been elected as the DF for CE5 (as indicated by the blocking of the link between CE5 and PE4). Similarly, as depicted in FIG. 1, PE4, rather than PE1, has been elected as the DF for CE6 (as indicated by the blocking of the link between CE6 and PE1).

FIG. 2 depicts an exemplary communication system illustrating VPLS using BGP-based multi-homing for multi-homed provider edge devices.

As depicted in FIG. 2, exemplary communication system 200 includes an MPLS Backbone Network 201$_B$ and an MPLS Metro Network 201$_M$ (collectively, MPLS Networks 201). The MPLS Backbone Network 201$_B$ includes three provider edge (PE) devices 210$_{B1}$-210$_{B3}$ (collectively, PEs 210$_B$, and also denoted herein as PE-B1, PE-B2, and PE-B3). Similarly, the MPLS Metro Network 201$_M$ includes three provider edge (PE) devices 210$_{M1}$-210$_{M3}$ (collectively, PEs 210$_M$, and also denoted herein as PE-M1, PE-M2, and PE-M3).

The PEs 210 have a VPLS service 211 provisioned thereon. The VPLS service 211 includes a plurality of virtual switching instances (VSIs) which are associated with the PEs 210 such that the PEs 210 each have a VSI-Identifier (VSI-ID) associated therewith for the VPLS 211, respectively. The VSI-IDs are omitted for purposes of clarity. Within MPLS Backbone Network 201$_B$, the PEs 210$_B$ are interconnected in a mesh topology using PWs (omitted for purposes of clarity), forming thereby a PW infrastructure between the VSIs of VPLS 211. Similarly, within MPLS Metro Network 201$_M$, the PEs 210$_M$ are interconnected in a mesh topology using PWs (omitted for purposes of clarity), forming thereby a PW infrastructure between the VSIs of VPLS 211. In each of MPLS Backbone Network 201$_B$ and MPLS Metro Network 201$_M$, the PW infrastructure between VSIs may be built using procedures from RFC 4761 (BGP VPLS), procedures from RFC 4762 (LDP VPLS), a mix of PW signaling procedures, and the like. In general, the PW infrastructures of the respective MPLS networks 201 may be signaled in any suitable manner (i.e., although primarily depicted and described with respect to an embodiment in which a PW infrastructure is signaled with LDP for an LDP VPLS using BGP-AD for discovery, it will be appreciated that the various embodiments depicted and described with respect to MPLS networks 201 may be utilized with a PW infrastructure signaled with BGP or with a PW infrastructure signaled using a mix of LDP-signaled and BGP-signaled PWs).

As depicted in FIG. 2, PE-B1 is multi-homed to PE-M1 and PE-M2, PE-B2 is multi-homed to PE-M1 and PE-M2, PE-M1 is multi-homed to PE-B1 and PE-B2, and PE-M2 is multi-homed to PE-B1 and PE-B2. As a result, PE-M1 and PE-M2 each may access MPLS Backbone Network 201$_B$ via PE-B1 or PE-B2 and, similarly, PE-B1 and PE-B2 each may offload to MPLS Metro Network 201$_M$ via PE-M1 or PE-M2. The PE-B3 and PE-M3 are not depicted as being multi-homed.

In one embodiment, each of the multi-homed PEs 210 is represented in the VPLS context via a multi-homed site object having a multi-homed identifier (denoted as multi-homed SITE-ID) associated therewith, respectively. In one embodiment, the multi-homed SITE-ID is unique within the scope of the VPLS 211, and serves to differentiate between multi-homed PEs 210 connected to the same VPLS Instance (i.e., to the same VSI on the same PE 210). For example, multi-homed SITE-IDs may be assigned as follows: (1) PE-B1, which is multi-homed to both PE-M1 and PE-M2, will be assigned the same multi-homed SITE-ID on both PE-M1 and PE-M2; (2) PE-B2, which is multi-homed to both PE-M1 and PE-M2, will be assigned the same multi-homed SITE-ID on both PE-M1 and PE-M2; (3) PE-M1, which is multi-homed to both PE-B1 and PE-B2, will be assigned the same multi-homed SITE-ID on both PE-B1 and PE-B2; and (4) PE-M2, which is multi-homed to both PE-B1 and PE-B2, will be assigned the same multi-horned SITE-ID on both PE-B1 and PE-B2. However, for the same VPLS instance, different multi-homed SITE-IDs are assigned for each of the multi-homed PEs 210. The single-homed PEs 210 (namely, PE-B3 and PE-M3) do not require allocation of a multi-homed SITE-ID; rather, the single-homed PEs 210 are associated with the addressing for the base VSI (e.g., either the VSI-ID or the VE-ID).

As will be appreciated, for each multi-horned PE 210, a designated forwarder (DF) election algorithm is executed for electing one of the PEs 210 to which the multi-homed PE 210 is multi-homed to be the designated forwarder for the multi-horned PE 210. In one embodiment, the DF election algorithm is implemented using the DF election procedure described in IETF Working Group Document, entitled "BGP based Multi-homing in Virtual Private LAN Service" and indicated by "draft-ietf-l2vpn-vpls-multihoming." In one embodiment, only local PEs 210 actively participate in the DF election algorithm (i.e., any PEs 210 remote from the multi-homed PE 210 are not required to participate in the DF election process). In one embodiment, the DF election algorithm is executed upon activation of a multi-homed site. As a result of the execution of the DF election algorithm, all of the PEs 210 associated with a multi-homed PE 210 in the VPLS will be placed in a standby state except for the PE 210 that is selected as the DF for the multi-homed PE 210.

As will be appreciated from FIG. 1 and FIG. 2, for each multi-homed site (e.g., CE device or PE device) that is multi-homed to multiple devices (e.g., PE devices), a DF election algorithm is executed for electing one of the devices to which the site is multi-homed to be the designated forwarder for the site. As also will be appreciated from FIG. 1 and FIG. 2, a multi-homed site for a particular VPLS has a multi-homed site object associated therewith and, similarly, has a multi-homed site identifier associated therewith. In one embodiment, as described herein, the generalized multi-homing capability supports use of a generalized multi-homed site object configured to support multiple types of endpoints and, further, supports use of a generalized multi-homed site identifier. An exemplary generalized multi-homed site object is depicted and described with respect to FIG. 3. An exemplary BGP data structure configured for supporting a generalized multi-homed site identifier (SITE-ID) is depicted and described with respect to FIG. 4.

Figure 3:
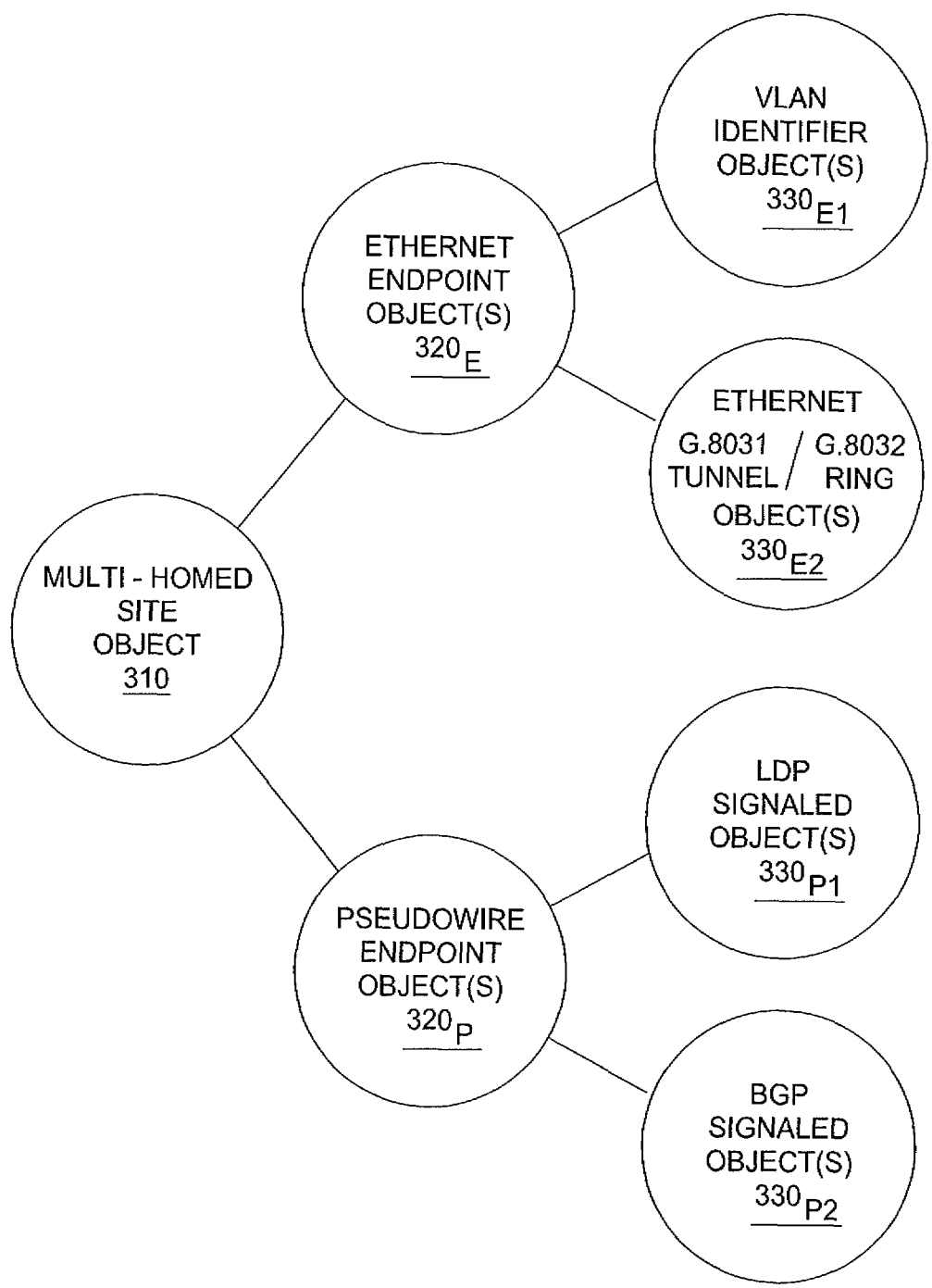
FIG. 3 depicts one embodiment of a generalized multi-homed site object configured for supporting various associated endpoint objects.

FIG. 3 depicts one embodiment of a generalized multi-homed site object configured for supporting various associated endpoint objects.

As depicted in FIG. 3, generalized multi-homed site object 300 is a hierarchical object a having a number of objects associated therewith. The generalized multi-homed site object 300 includes a multi-homed site object 310, which forms the root of generalized multi-homed site object 300. The multi-homed site object 310 has associated therewith an Ethernet endpoint object $320_E$ that is configured to support one or more Ethernet objects and a PW endpoint object $320_P$ configured to support one or more PW objects. The Ethernet endpoint object $320_E$ has associated therewith one or more VLAN Identifier objects $330_{E1}$ and one or more Ethernet tunnel and/or ring objects $330_{E2}$ (e.g., Ethernet G.8031 tunnel objects and/or Ethernet G.8032 ring objects). The PW endpoint object $320_P$ has associated therewith one or more LDP signaled objects $330_{P1}$ and one or more BGP signaled objects $330_{P2}$.

It is noted that FIG. 3 illustrates one embodiment of a generalized multi-homed site object, and that various other embodiments of a generalized multi-homed site object may be implemented using various subsets of the objects depicted and described with respect to FIG. 3. In one embodiment, for example, a generalized multi-homed site object includes an Ethernet endpoint object $320_E$ having associated therewith one or more VLAN Identifier objects $330_{E1}$. In one embodiment, for example, a generalized multi-homed site object includes an Ethernet endpoint object $320_E$ having associated therewith one or more Ethernet tunnel objects $330_{E2}$ (e.g. one or more G.8031 tunnel objects). In one embodiment, for example, a generalized multi-homed site object includes an Ethernet endpoint object $320_E$ having associated therewith one or more Ethernet ring objects $330_{E2}$ (e.g. one or more G.8032 ring objects). In one embodiment, for example, a generalized multi-homed site object includes a PW endpoint object $320_P$ having associated therewith one or more LDP signaled objects $330_{P1}$ and one or more BGP signaled objects $330_{P2}$. In one embodiment, for example, a generalized multi-homed site object includes an Ethernet endpoint object $320_E$ having associated therewith one or more VLAN Identifier objects $330_{E1}$ and a PW endpoint object $320_P$ having associated therewith one or more LDP signaled objects $330_{P1}$.

It is noted that a generalized multi-homed site object may include other combinations of objects depicted and described with respect to FIG. 3.

It is further noted that a generalized multi-homed site object may include one or more other types of objects not depicted and described with respect to FIG. 3 (e.g., in place of and/or in addition to objects depicted and described with respect to FIG. 3). In various embodiments, different types of access objects may be associated with a multi-homed site and, thus, with a generalized multi-homed site object. For example, the following types of access objects may be associated with a multi-homed site and its associated generalized multi-homed site object: (1) attachment circuits (ACs); (2) other types of PW objects (e.g., mesh-PW objects, spoke-PW objects, and the like); and (3) Split Horizon Groups (SHGs) where, under an SHG, one or more of the following objects may be associated with a multi-homed site: ACs and/or PWs (e.g., BGP VPLS, BGP-AD, provisioned and LDP signaled mesh-PWs and/or spoke-PWs, and the like). It will be appreciated that any other suitable access objects also may be associated with a multi-homed site.

It is further noted, from the foregoing embodiments, that the generalized multi-homed site object depicted and described herein is configured for enabling support for multi-homing among various types of devices in various types of networks.

As described herein, a multi-homed site and, thus, its generalized multi-homed site object, has a generalized multi-homed site identifier (SITE-ID) associated therewith. The multi-homed SITE-ID may be communicated using any suitable type of signaling. In one embodiment, in which BGP is used for signaling, the multi-homed SITE-ID may be signaled by modifying the standard BGP usage of Network Layer Reachability Information (NLRI) for VPLS in order to provide BGP usage of NLRI for VPLS multi-homing. An exemplary BGP data structure configured for supporting a generalized multi-homed site identifier (SITE-ID) is depicted and described with respect to FIG. 4.

Figure 4:
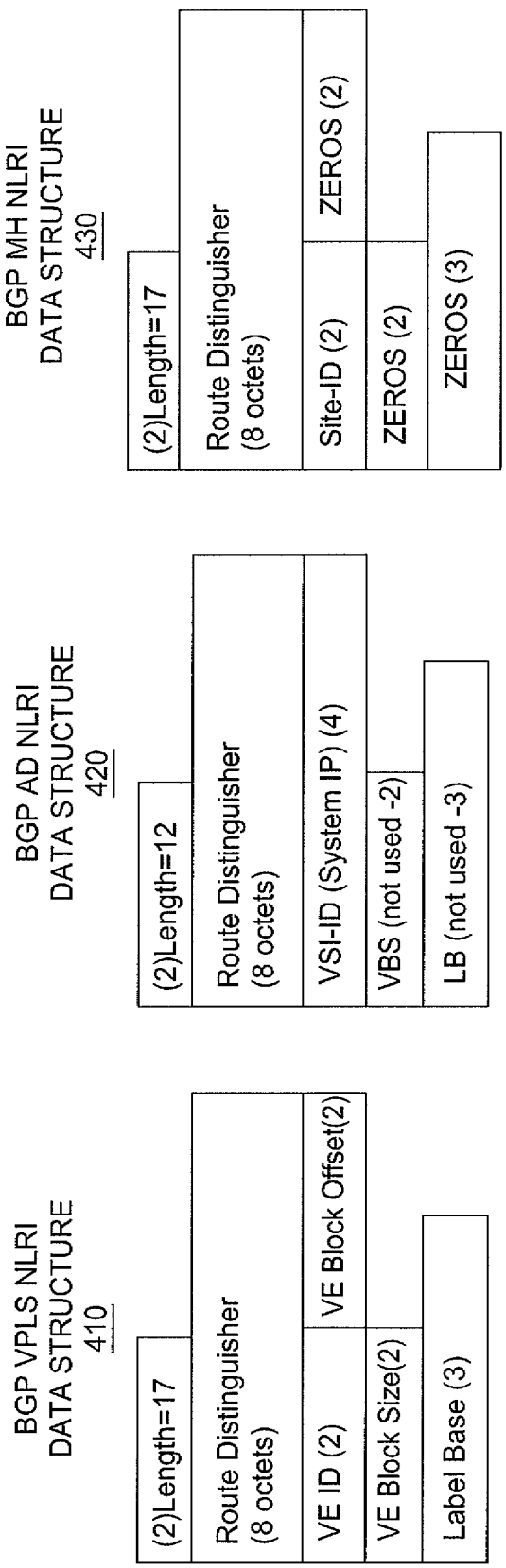
FIG. 4 depicts a comparison of BGP usage of the NLRI for VPLS and BGP usage of the NLRI for AD to BGP usage of the NLRI for VPLS multi-homing.

FIG. 4 depicts a comparison of BGP usage of the NLRI for VPLS and BGP usage of the NLRI for AD to BGP usage of the NLRI for VPLS multi-homing.

In general, BGP uses UPDATE messages to send routing updates to peers, where an UPDATE message may include unreachable routes information, path attributes, Network Layer Reachability Information (NLRI), and the like.

In FIG. 4, three data structures are depicted as follows: a BGP VPLS NLRI data structure 410, a BGP AD NLRI data structure 420, and a BGP MH NLRI data structure 430.

The BGP VPLS NLRI data structure 410 includes a two-byte length field which indicates the length of the remainder of the data structure (illustratively, length=17), an eight-byte Route Distinguisher (RD) field, a two-byte VE-ID field, a two-byte VE Block Offset field, a two-byte VE Block Size field, and a three-byte Label Base field. It will be appreciated that the last seven bytes of the BGP VPLS NLRI data structure 410 are typically used to instantiate a PW. The BGP VPLS NLRI data structure 410 is defined in RFC 4761, which describes BGP-based VPLS and is hereby incorporated by reference herein in its entirety.

The BGP AD NLRI data structure 420 includes a two-byte length field which indicates the length of the remainder of the data structure (illustratively, length=12), an eight-byte Route Distinguisher (RD) field and a four-byte VSI-ID field (e.g., System IP). The BGP AD NLRI data structure 420 also may have the following fields which may be unused in this context: a two-byte VBS field and a three-byte Label Base field. The BGP AD NLRI data structure 420 is defined in RFC 4762, which describes LDP-based VPLS and is hereby incorporated by reference herein in its entirety.

The BGP MH NLRI data structure 430, in at least one embodiment, includes the following fields: a two-byte length field which indicates the length of the remainder of the data structure (illustratively, length=17), an eight-byte Route Distinguisher (RD) field, a two-byte generalized multi-homed SITE-ID field, a two-byte set to a default value (e.g., zeros), a two-byte field set to a default value (e.g., zeros), and a three-byte field set to a default value (e.g., zeros). It is noted that this embodiment of the BGP MH NLRI data structure 430 may be considered to be a modified version of the BGP VPLS NLRI data structure 410 in which (1) the VE-ID field is replaced with a generalized multi-homed SITE-ID field that identifies the multi-homed site and (2) the last seven bytes which, as noted above, are typically used to instantiate a PW, are not used for BGP-based MH and, thus, are set to any suitable default value (e.g., all zeros or any other suitable values).

In one embodiment, use of BGP MH NLRI data structure 430 for providing generalized multi-homing results in the following processing in the VPLS PE receiving the BGP MH NLRI data structure 430: (1) for a BGP VPLS PE, no Label information indicates that there is no need to set up a BGP PW, and (2) in a BGP AD for LDP VPLS, a length of 17 indicates a BGP VPLS NLRI that does not require any PW LDP signaling.

As described above, use of BGP MH NLRI data structure 430 for providing generalized multi-homing enables identification of BGP Update messages that are not destined for PW signaling. This type of identification enables PEs receiving the BGP MH NLRI data structure 430 to perform other types of processing in support of generalized multi-homing.

First, the RD of the BGP MH NLRI data structure 430 ensures that NLRIs associated with a certain multi-homed SITE-ID on different PEs are seen as different by any of the intermediate BGP nodes (e.g., Route Reflectors (RRs), Autonomous System Boundary Routers (ASBRs), and the like) on the path between the multi-homed PEs, thereby ensuring that the multi-homed NLRIs reach the PEs that are involved in the multi-homed VPLS.

Second, the L2-Info Extended Community, described in RFC 4761, may be used in the BGP MH NLRI data structure 430 to initiate a MAC flush for blackhole avoidance in order to indicate the operational and administrative status for the multi-homed site or the DF election status.

Figure 5:
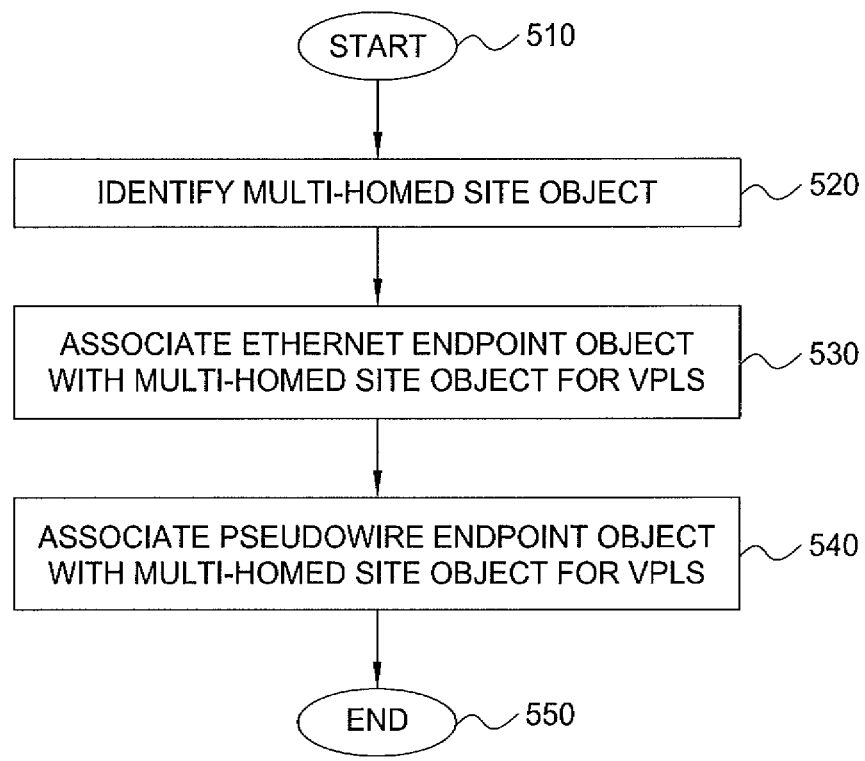
FIG. 5 depicts one embodiment of a method for generating a generalized multi-homed site object configured for use in supporting multi-homing for VPLS.

FIG. 5 depicts one embodiment of a method for generating a generalized multi-homed site object configured for use in supporting multi-homing for VPLS. At step 510, method 500 begins. At step 520, a multi-homed site object is identified. At step 530, an Ethernet endpoint object for the VPLS is associated with the multi-homed site object. At step 540, a pseudowire endpoint object for the VPLS is associated with the multi-homed site object. At step 550, method 500 ends. Although depicted and described as ending, it will be appreciated that method 500 also may include various other steps (e.g., storing the generalized multi-homed site object in memory, executing a DF election algorithm, executing a blackhole avoidance process, and the like, as well as various combinations thereof).

Figure 6:
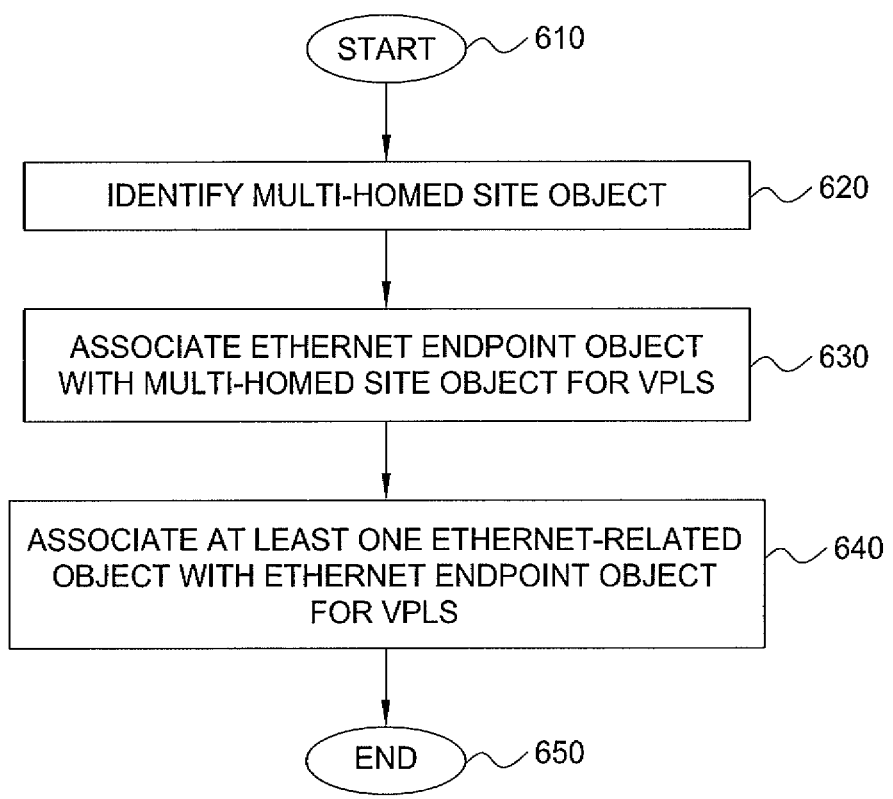
FIG. 6 depicts one embodiment of a method for generating a generalized multi-homed site object configured for use in supporting multi-homing for VPLS.

FIG. 6 depicts one embodiment of a method for generating a generalized multi-homed site object configured for use in supporting multi-homing for VPLS. At step 610, method 600 begins. At step 620, a multi-homed site object is identified. At step 630, an Ethernet endpoint object for the VPLS is associated with the multi-homed site object. At step 640, at least one Ethernet-related object (e.g., a VLAN ID object, a G.8031 tunnel object, a G.8032 ring object, and the like, as well as various combinations thereof) is associated with the Ethernet endpoint object. At step 650, method 600 ends. Although depicted and described as ending, it will be appreciated that method 600 also may include various other steps (e.g., storing the generalized multi-homed site object in memory, executing a DF election algorithm, executing a blackhole avoidance process, and the like, as well as various combinations thereof).

It is noted that the various object associations depicted and described herein may be formed, maintained, and/or used in any suitable manner (e.g., using any suitable data structures, pointers, data mapping constructs, and the like, as well as various combinations thereof).

As described herein, various embodiments may include a blackhole avoidance scheme providing blackhole avoidance for Ethernet solutions and PW-based solutions (e.g., using MAC flush indications toward the core PEs and providing indications of DF election results toward the CE and PE devices using Ethernet OAM for Ethernet solutions and LDP signaling for PW-based solutions).

In general, blackholing refers to the forwarding of frames from a multi-homed device to a PE that is no longer operating as the designated forwarder for the multi-homed device. This could happen, for example, for traffic from a core PE participating in the main VPLS, traffic from access PEs (e.g., PWs between them and the multi-homed PEs that are associated with the multi-homed sites), or traffic from CEs.

In one embodiment, blackhole avoidance is provided by performing one or both of (1) providing MAC flush indications toward the core PEs and (2) indicating DF election results toward the access PEs and CEs (e.g., using Ethernet OAM capabilities in the case of Ethernet endpoints, using LDP PW status signaling in the case of pseudowire endpoints, and the like).

In one embodiment, as indicated above, blackhole avoidance for core PEs is supported by providing MAC flush indications toward the core PEs. In one embodiment, when there is a transition of a multi-homed site, associated with a core PE, from having DF status to having non-DF status, the following actions are initiated: (1) the core PE that owns the multi-homed site experiencing the transition generates a negative MAC flush indicator and propagates the negative MAC flush indicator toward any related core PEs and (2) each related core PE, upon receiving a negative MAC flush indicator, will flush all of the MACs learned by the related core PE from the core PE that owns the multi-homed site. In this embodiment, the negative MAC flush indicator(s) may be sent to the related core PE(s) in any suitable manner. In one such embodiment, for example, the negative MAC flush indicator(s) may be sent to the related core PE(s) using one or more core mechanisms as follows: (a) for an LDP VPLS running between core PEs, the negative MAC flush indicator(s) may be sent to the related core PE(s) using the LDP MAC flush capability and (b) for a PW-signaled-with-BGP, the negative MAC flush indicator(s) may be sent to the related core PE(s) implicitly by using the L2-Info Extended Community to indicate a transition of the active multi-homed site (e.g., the attached object(s) transitioning from DF status or non-DF status or the entire multi-homed site transitioning from DF status to non-DF status. It is noted that use of such core mechanisms is not expected to result in double flushing, because it is expected that, between any pair of core PEs, only one type of PW will exist (namely, either an LDP PW or a BGP PW).

As indicated above, blackhole avoidance for access PEs and CEs may be supported by indicating DF election results toward the access PEs and CEs. In one embodiment, DF election result indications may be provided using different techniques for pseudowire endpoints and Ethernet endpoints.

In one embodiment, in the case of a PW endpoint (e.g., for a multi-homed PE where a link between the multi-homed PE and a PE is blocked because the PE is not elected as the DF for the multi-homed PE), an indication of the DF election result may be propagated from the PE to the multi-homed PE using LDP signaling. In one embodiment, for example, a PW Status Indicator (e.g., available as part of LDP signaling) may be used to provide an indication of the DF election result from the PE to the multi-homed PE. In FIG. 2, for example, LDP signaling may be used to propagate a PW status indicator from PE-B2 to PE-M1 when PE-B1 is elected as the DF for PE-M1, thereby informing PE-M1 that its frames should be forwarded to PE-B1 rather than PE-B2.

In one embodiment, in the case of an Ethernet endpoint (e.g., for a multi-homed CE where a link between the CE and one of the access PEs is blocked because the PE is not elected as the DF for the CE), an indication of the DF election result may be propagated from the PE to the CE using IEEE OAM Procedures (e.g., using one or more capabilities of the IEEE 802.1ag standard, which is hereby incorporated by reference herein in its entirety).

In one embodiment, for example, an IEEE Interface Status TLV may be used to provide an indication of the DF election result from the PE to the CE. For example, an IEEE Interface Status TLV is configured to indicate to the CE that the interface of the access PE for the link is down as a result of the DF election algorithm, and then the IEEE Interface Status TLV is propagated from the PE to the CE. The CE, upon receiving the IEEE Interface Status TLV, determines that the interface of the access PE for the link is down as a result of the DF election algorithm, thereby informing the CE that the PE is not the DF and, thus, that the CE should not attempt to forward frames to the PE via the link. In FIG. 1, for example, an IEEE Interface Status TLV may sent from PE1 to CE6 when PE4 is elected as the DF for CE6, thereby informing CE6 that its frames should be forwarded to PE4 rather than PE1.

In one embodiment, for example, an IEEE Continuity Check (CC) Frame capability may be used to provide an indication of the DF election result from the PE to the CE. For example, where a PE periodically sends CC Frames to a CE, the indication of the DF election result may be provided from the PE to the CE by preventing propagation of CC Frames from the PE to the CE. The CE is configured, upon failing to receive expected CC Frames, to determine that the interface of the access PE for the link is down as a result of the DF election algorithm, such that the CE is thereby informed that the PE is not the DF and, thus, that the CE should not attempt to forward frames to the PE via the link. In FIG. 1, for example, PE1 may stop sending IEEE CC Frames to CE6 when PE4 is elected as the DF for CE6, thereby enabling CE6 to determine that its frames should be forwarded to PE4 rather than PE1.

Although primarily depicted and described herein with respect to embodiments in which a multi-homed device is multi-homed to only two PE devices, it will be appreciated that a multi-homed device may be multi-homed to any suitable number of PE devices. In one embodiment, a DF election algorithm may be executed amongst all of the three or more PE devices for selecting only one of the PE devices as the DF for the multi-homed device. In one embodiment, each of the two or more PE devices not selected as the DF for the multi-homed device informs the multi-homed device regarding DF election status for purposes of providing blackhole avoidable. It will be appreciated that various other modifications and/or alternatives may be supported in this context.

In one embodiment, a generalized multi-homing capability may be used to provide inter-domain resiliency between different VPLS domains in a hierarchical VPLS (HVPLS) system. An exemplary use of generalized multi-homing to provide inter-domain resiliency in an HVPLS system is depicted and described with respect to FIG. 7.

Figure 7:
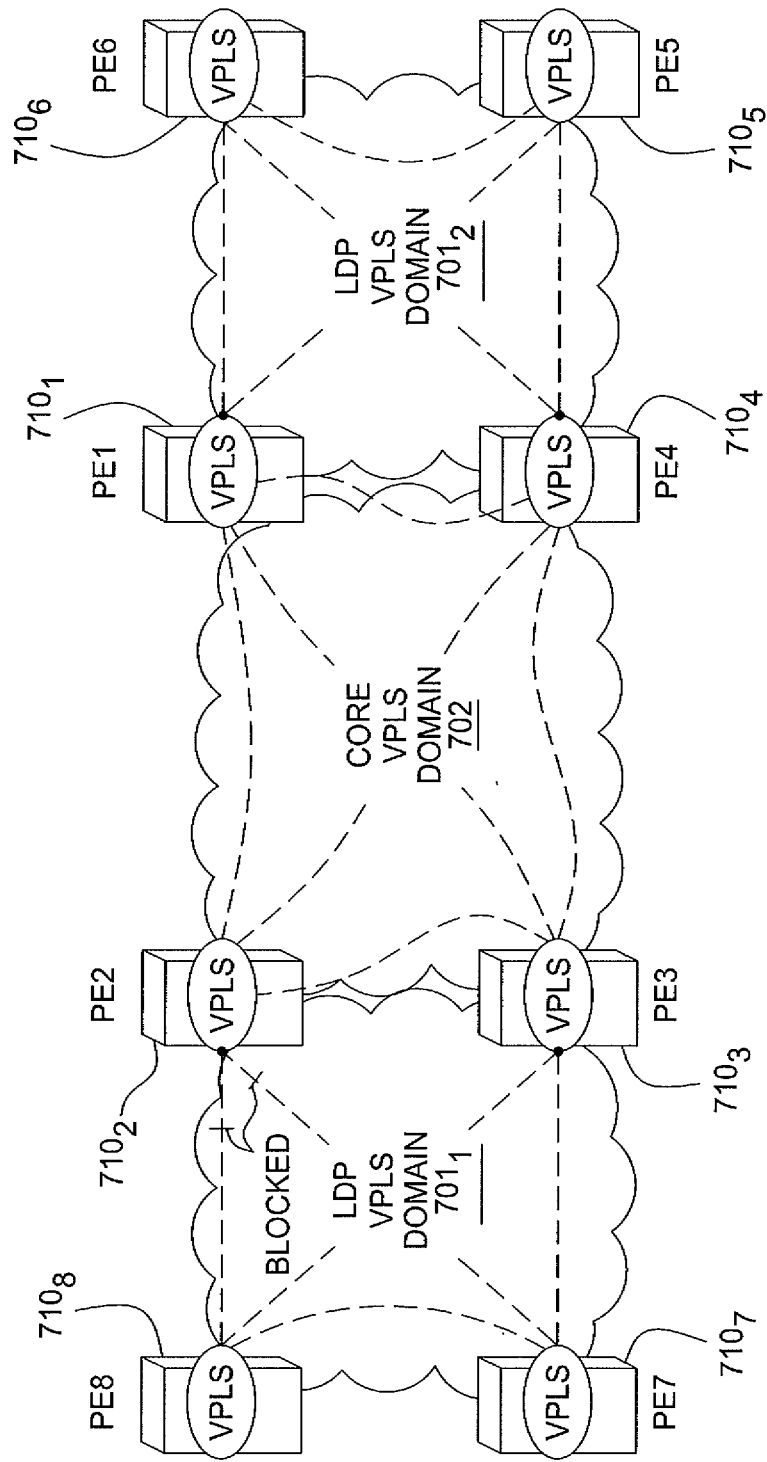
FIG. 7 depicts an HVPLS system for illustrating use of generalized multi-homing to provide inter-domain resiliency in an HVPLS system.

FIG. 7 depicts an HVPLS system for illustrating use of generalized multi-homing to provide inter-domain resiliency in an HVPLS system.

As depicted in FIG. 7, HVPLS system 700 includes first and second LDP-based VPLS domains $701_1$ and $701_2$ (collectively, LDP-based VPLS domains 701) which are interconnected via a core VPLS domain 702. The core VPLS domain may be implemented as a BGP-based VPLS domain or an LDP-based VPLS domain.

As depicted in FIG. 7, HVPLS system 700 includes eight PE devices $710_1$-$710_8$ (collectively, PEs 710, which are denoted as PE1 through PE8, respectively). The PEs $710_2$, $710_3$, $710_7$, and $710_8$ each are configured to support first LDP-based VPLS domain $701_1$, the PEs $710_1$, $710_4$, $710_5$, and $710_6$ each are configured to support second LDP-based VPLS domain $701_2$, and the PEs $710_1$, $710_2$, $710_3$, and $710_4$ each are configured to support core VPLS domain 702. As depicted in FIG. 7, the PEs 710 support various PWs configured therebetween, as indicated by the dashed lines.

In one embodiment, gateway PEs 710 may be configured to support BGP-based multi-homing, where one multi-homed site is assigned to each of the PWs connecting associated access PEs 710. For example, with respect to first LDP-based VPLS domain $701X_1$, gateway PEs $710_2$ and $710_3$ are running BGP multi-homing where one multi-homed site is assigned to each of the PWs connecting access PEs $710_7$ and $710_8$. Similarly, for example, with respect to second LDP-based VPLS domain $701_2$, gateway PEs $710_1$ and $710_4$ are running BGP multi-homing where one multi-homed site is assigned to each of the PWs connecting access PEs $710_5$ and $710_6$.

In one embodiment, a multi-homed site may be associated to multiple access PWs using an access SHG. In one such embodiment, for example, the multi-homed site may be associated to multiple access PWs using an access SHG.

Figure 8:
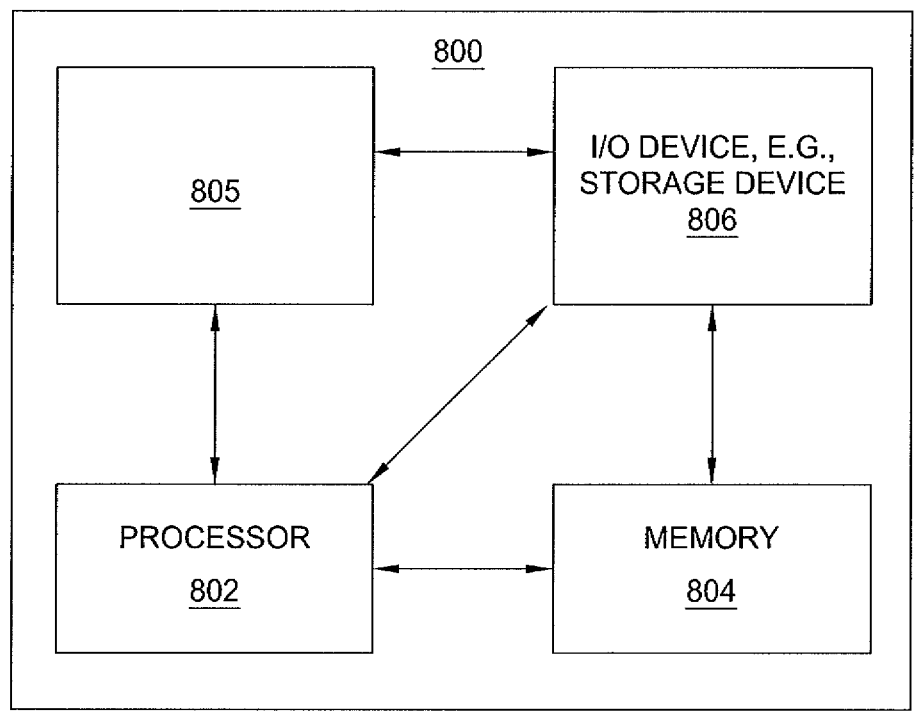
FIG. 8 depicts a high-level block diagram of a computer suitable for use in performing the functions described herein.

FIG. 8 depicts a high-level block diagram of a computer suitable for use in performing functions described herein.

As depicted in FIG. 8, computer 800 includes a processor element 802 (e.g., a central processing unit (CPU) and/or other suitable processor(s)), a memory 804 (e.g., random access memory (RAM), read only memory (ROM), and the like), a cooperating module/process 805, and various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 805 can be loaded into memory 804 and executed by processor 802 to implement the functions as discussed herein. Thus, cooperating process 805 (including associated data structures) can be stored on a computer readable storage medium, e.g., RAM memory, magnetic or optical drive or diskette, and the like.

It will be appreciated that computer 800 depicted in FIG. 8 provides a general architecture and functionality suitable for implementing functional elements described herein and/or portions of functional elements described herein. For example, the computer 800 provides a general architecture and functionality suitable for implementing one or more of core PE devices, access PE devices, CE devices, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for generating a generalized multi-homed site object, comprising:
a processor and a memory communicatively connected to the processor, the processor configured to:
identify a multi-homed site object for a Virtual Private Local Area Network (LAN) Service (VPLS), wherein a multi-homed device within the VPLS is represented by the multi-homed site object;
associate an Ethernet endpoint object with the multi-homed site object for the VPLS, wherein an Ethernet endpoint is represented by the Ethernet endpoint object; and
associate a pseudowire endpoint object with the multi-homed site object for the VPLS, wherein an pseudowire endpoint is represented by the pseudowire endpoint object;
wherein the multi-homed site object is configured to provide multi-homing support for the Ethernet endpoint object and the pseudowire endpoint object.

2. The apparatus of claim 1, wherein the processor is configured to:
associate a Virtual LAN (VLAN) Identifier object with the Ethernet endpoint object.

3. The apparatus of claim 1, wherein the processor is configured to:
associate a G.8031 tunnel object with the Ethernet endpoint object.

4. The apparatus of claim 1, wherein the processor is configured to:
associate a G.8032 ring object with the Ethernet endpoint object.

5. The apparatus of claim 1, wherein the processor is configured to:
associate a Label Distribution Protocol (LDP) signaled object with the pseudowire endpoint object.

6. The apparatus of claim 1, wherein the processor is configured to:
associate a Border Gateway Protocol (BGP) signaled object with the pseudowire endpoint object.

7. The apparatus of claim 1, where the processor is configured to initiate storage of the generalized multi-homed site object in a memory.

8. The apparatus of claim 1, further comprising:
a memory configure to store the generalized multi-homed site object.

9. The apparatus of claim 1, wherein the processor is configured to:
execute a designated forwarder election algorithm for determining whether or not the generalized multi-homed site object is elected as the designated forwarder for the VPLS.

10. A method for generating a generalized multi-homed site object, comprising:
using a processor for:
identifying a multi-homed site object for a Virtual Private Local Area Network (LAN) Service (VPLS), wherein a multi-homed device within the VPLS is represented by the multi-homed site object;
associating an Ethernet endpoint object with the multi-homed site object for the VPLS, wherein an Ethernet endpoint is represented by the Ethernet endpoint object; and
associating a pseudowire endpoint object with the multi-homed site object for the VPLS, wherein an pseudowire endpoint is represented by the pseudowire endpoint object;
wherein the multi-homed site object is configured to provide multi-homing support for the Ethernet endpoint object and the pseudowire endpoint object.

11. An apparatus for generating a generalized multi-homed site object, comprising:
a processor and a memory communicatively connected to the processor, the processor configured to:
identify a multi-homed site object for a Virtual Private Local Area Network (LAN) Service (VPLS), wherein a multi-homed device within the VPLS is represented by the multi-homed site object;
associate an Ethernet endpoint object with the multi-homed site object for the VPLS, wherein an Ethernet endpoint is represented by the Ethernet endpoint object; and
perform at least one of:
associate a Virtual LAN (VLAN) Identifier object with the Ethernet endpoint object;
associate a G.8031 tunnel object with the Ethernet endpoint object; and
associate a G.8032 ring object with the Ethernet endpoint object;
wherein the multi-homed site object is configured to provide multi-homing support for the Ethernet endpoint object.

12. The apparatus of claim 11, wherein the processor is configured to perform at least two of:
associate a Virtual LAN (VLAN) Identifier object with the Ethernet endpoint object;
associate a G.8031 tunnel object with the Ethernet endpoint object; and
associate a G.8032 ring object with the Ethernet endpoint object.

13. The apparatus of claim 11, wherein the processor is configured to perform each of:
associate a Virtual LAN (VLAN) Identifier object with the Ethernet endpoint object;
associate a G.8031 tunnel object with the Ethernet endpoint object; and
associate a G.8032 ring object with the Ethernet endpoint object.

14. The apparatus of claim 11, wherein the processor is configured to:
associate a pseudowire endpoint object with the multi-homed site object for the VPLS.

15. The apparatus of claim 14, wherein the processor is configured to:
associate a Label Distribution Protocol (LDP) signaled object with the pseudowire endpoint object.

16. The apparatus of claim 14, wherein the processor is configured to:
associate a Border Gateway Protocol (BGP) signaled object with the pseudowire endpoint object.

17. The apparatus of claim 11, where the processor is configured to initiate storage of the generalized multi-homed site object in a memory.

18. The apparatus of claim 11, further comprising:
a memory configured to store the generalized multi-homed site object.

19. The apparatus of claim 11, wherein the processor is configured to:
execute a designated forwarder election algorithm for determining whether or not the generalized multi-homed site object is elected as the designated forwarder for the VPLS.

20. A method for generating a generalized multi-homed site object, comprising:
- using a processor for:
- identifying a multi-homed site object for a Virtual Private Local Area Network (LAN) Service (VPLS), wherein a multi-homed device within the VPLS is represented by the multi-homed site object;
- associating an Ethernet endpoint object with the multi-homed site object for the VPLS, wherein an Ethernet endpoint is represented by the Ethernet endpoint object; and
- performing at least one of:
  - associating a Virtual LAN (VLAN) Identifier object with the Ethernet endpoint object;
  - associating a G.8031 tunnel object with the Ethernet endpoint object; and
  - associating a G.8032 ring object with the Ethernet endpoint object;
- wherein the multi-homed site object is configured to provide multi-homing support for the Ethernet endpoint object.

* * * * *